US006667591B2

(12) United States Patent
Mullet et al.

(10) Patent No.: US 6,667,591 B2
(45) Date of Patent: Dec. 23, 2003

(54) METHOD AND DEVICE FOR INCREASING THE ALLOWED MOTOR POWER OF A MOTORIZED GARAGE DOOR OPERATOR

(75) Inventors: Willis Jay Mullet, Gulf Breeze, FL (US); James S. Murray, Milton, FL (US)

(73) Assignee: Wayne-Dalton Corp., Mt. Hope, OH (US)

(*) Notice: Subject to any disclaimer, the term of this patent is extended or adjusted under 35 U.S.C. 154(b) by 29 days.

(21) Appl. No.: 09/982,477

(22) Filed: Oct. 18, 2001

(65) Prior Publication Data

US 2003/0076062 A1 Apr. 24, 2003

(51) Int. Cl.[7] .................................................. G05B 5/00
(52) U.S. Cl. ....................... 318/445; 318/460; 318/466; 318/469
(58) Field of Search ................................ 318/466, 280, 318/460, 480, 467, 468, 484, 443, 445, 469; 160/292

(56) References Cited

U.S. PATENT DOCUMENTS

| 4,119,896 A | | 10/1978 | Estes, III et al. ............ 318/266 |
| 4,405,923 A | * | 9/1983 | Matsuoka et al. ...... 340/825.56 |
| 5,218,282 A | * | 6/1993 | Duhame ..................... 318/603 |
| 5,278,480 A | | 1/1994 | Murray ........................ 318/626 |
| 5,929,580 A | * | 7/1999 | Mullet et al. ................ 318/466 |
| 6,161,438 A | | 12/2000 | Mullet et al. .................. 73/774 |
| 6,172,475 B1 | | 1/2001 | Fitzgibbon et al. ......... 318/266 |
| 6,229,279 B1 | | 5/2001 | Dierker ....................... 318/565 |
| 6,239,569 B1 | | 5/2001 | Fitzgibbon et al. ......... 318/480 |
| 2003/0102837 A1 | | 6/2003 | Keller, Jr. ................... 318/466 |

* cited by examiner

Primary Examiner—Karen Masih
(74) Attorney, Agent, or Firm—Renner, Kenner, Greive, Bobak, Taylor & Weber

(57) ABSTRACT

A door operator for moving a door includes a motor for moving the door between opened and closed positions, an operator for controlling the operation of the motor, and a switch, such as a wired wall station or a remote transmitter, for enabling the operator to control operation of the motor. Pushing and releasing the switch results in the operator allowing the motor to apply a normal range of torque values, and wherein pushing and holding the switch results in the operator allowing the motor to apply a broader-than-normal range of torque values. An external safety device coupled to the operator may be used with the operator. If the external safety device is enabled and the door is closing, the motor allows application of a higher-than-normal range of torque values. The door operator may also take corrective action if excessive door speed is detected. But, this corrective action can be overridden if the switch is held closed for a predetermined time.

33 Claims, 6 Drawing Sheets

METHOD AND DEVICE FOR INCREASING THE ALLOWED MOTOR POWER OF A MOTORIZED GARAGE DOOR OPERATOR

TECHNICAL FIELD

Generally, the present invention relates to a garage door operator system for use on a closure member moveable relative to a fixed member. More particularly, the present invention relates to an operator-controlled motor for controlling the operation of a closure member, such as a gate or door, between a closed position and an open position. More specifically, the present invention relates to an operator-controlled motor for a door or gate operator, wherein additional power is allowed by the motor to overcome hindrances in door movement.

BACKGROUND ART

For convenience purposes, it is well known to provide garage doors which utilize a motor to provide opening and closing movements of the door. Motors may also be coupled with other types of movable barriers such as gates, windows retractable overhangs and the like. An operator is employed to control the motor and related functions with respect to the door. The operator receives command signals for the purpose of opening and closing the door from a wireless remote, from a wired wall station or other similar device. It is also known to provide safety devices that are connected to the operator for the purpose of detecting an obstruction so that the operator may then take corrective action with the motor to avoid entrapment of the obstruction.

Safety devices come in many forms for use with a garage door operator. One of the more widely used devices is a photo-electric eye which projects a light beam across the door's travel path. If the light beam is interrupted during closure of the door, the operator stops and/or stops and reverses the travel of the door. This is sometimes referred to as a non-contacting or an external safety device. Contact type safety devices such as an edge-sensitive pressure switch, which is attached to the bottom edge of the door and runs the complete width of the door, may also be used. Other contact safety devices directly monitor the operating characteristics of the driving motor to determine whether an obstruction is present. Typically, shaft speed of the motor is monitored by projecting an infrared light through an interrupter wheel. Alternatively, Hall effect switches or tachometers can be used to monitor shaft speed. Or, the motor current could be monitored such that when an excessive amount of current is drawn by the motor—which indicates that the motor is working harder than normal—it is presumed that an obstruction has been encountered. It is also known to monitor door speed with a sliding potentiometer, wherein a rate of change is equated to the speed of the door and wherein unexpected slowing of the door triggers corrective action by the operator. Regardless of how the safety devices work, their purpose is to ensure that individuals, especially children, are not entrapped by a closing door. Opening forces of the door are also monitored to preclude damage to the operating system for instances where an object or individual is caught upon a door panel as the door moves upwardly.

How safety devices are used with a door operator system have evolved from the days of no uniform standard to the currently applied government regulations as embodied in Underwriters Laboratories Standard 325. The basic standard requires the use of a fail-safe external safety device, such as a photo-electric eye, that is connected to the operator. Use of the external safety device allows either a wired wall station or a wireless remote control device to send a signal to the operator to close the door when the user exerts a momentary push and release force upon an actuation button. To open the door, one may also use a push and release of the appropriate wall station or remote control switch. If, for whatever reason, the safety device is disabled, a constant pressure force applied to the wall station switch or to a remote control switch in the line of sight of the operator will allow the door to close. It is presumed that the user is watching the path of the door for objects which may be entrapped in the path of the door. The safety standard will not allow the constant application of pressure on a remote device out of the line of sight to close the door. However, momentary pressure on either the remote device switch or the wall station switch will allow the door to open even if the safety system is disabled.

A newer generation of operating systems have been found to provide improved sensitivity to extraneous forces applied to a door during its movement. One such device is disclosed in U.S. Pat. No. 6,161,438, which is assigned to the present assignee of this invention and which is incorporated herein by reference. Briefly, this patent discloses use of a potentiometer coupled to the door for determining a plurality of positional locations between the open and closed positions. A processor contained in the operator correlates the position of the door with an applied force for use in comparison to a predetermined threshold. If, during movement of the door, the applied force is outside the limits of the predetermined threshold, corrective action can be taken. With this increased sensitivity, the safety standard allows use of the above operator system without an external safety system on anti-pinch doors. Anti-pinch doors use sectional panels that preclude the entry of objects, such as fingers, between the door panels during opening and closing cycles. As before, actuation and release of the switch opens and closes the door. Constant pressure on the switch has no affect on the operator. If an obstruction is encountered and a force is exerted which exceeds the threshold, corrective action is taken. However, if a door is a pinch-type door, then the external safety device must be used with the operator. In this embodiment, actuation and release of the switch opens and closes the door. If the external safety device detects an object in the presence of the door path, then corrective action is taken. And if the force required by the motor to move the door exceeds the threshold limit, then the operator also takes corrective action.

With the foregoing in mind, it will be appreciated that controls for a motorized garage door operator regulate the motor speed to a constant velocity of the door. This constant speed can be detrimental to a garage door when the operator first begins to move the door. Accordingly, motor controls have been developed that reduce the voltage supplied to the motor during start-up to allow for a "soft start," preventing damage to the door and also for a "soft finish." Some manufacturers use a reduced speed start then ramp up the motor to increase the door speed to minimize door opening time and, sometimes, closing time. Both of the speed adjustments are controlled by the operator's motor controls.

These motorized garage door operators are known to have force adjustments that can be either mechanically or electronically controlled. This allows the installer, or the consumer, a way of adjusting the force that the motor exerts on the door. The amount of force to move the door will vary with the weight of the door, but can also vary as the environment changes and as the door system becomes worn with age. Generally, the information necessary to properly set these limits is contained in the owner's/installation manual. However, in the case of a door frozen to the floor, one must increase the force adjustment to free the door. In the event the adjustment is not reset, the door's safety settings are not what they should be. The same also applies if the door is opened when one of the counter-balance springs are broken and the force limit is not reset after the springs are replaced. Accordingly, there is no safe and secure way to provide additional power to the motor to lift a door frozen to the ground or to accommodate for broken springs in the operator and then to return the door operator system to its preferred operation mode. These conditions or hindrances are especially problematic when ensuring that the operator complies with the aforementioned safety standard. Therefore, there is a need in the art for an operating system that complies with safety regulations and that allows for application of increased force to accommodate special situations wherein operation of the door is hindered.

DISCLOSURE OF INVENTION

It is thus an object of the present invention to provide a system and method for the application of additional force when needed for a door or gate that moves between an open and close position. The door or gate is of the type that is moveable into an out-of-proximity with a fixed surface that is to be sealed relative to the door. The door or gate is coupled to a motorized operator which controls movement of the door.

It is another object of the present invention to provide a connection between an external safety system and the operator. The external safety system may be a photo-electric eye or the like. It is yet another object of the present invention, as set forth above, to provide an operator that receives signals from the safety system to assist in the operation and control of the motor.

It is a further object of the present invention, as set forth above, to provide a mechanism such as counter-balance springs coupled to the operator to assist in moving the door in a desired direction It is yet another object of the present invention, as set forth above, to provide a switch that generates control signals that are received by the operator. The switch may be remotely actuated, a hard-wired control button, a remote control button, an alpha-numeric keypad, or the like.

It is still another object of the present invention, as set forth above, to provide an operator to utilize a force profile to monitor the operating characteristics of the motor with respect to door position during door travel. It is still a further object of the present invention, as set forth above, to provide an operator that initiates corrective action whenever the motor applies a force outside the predetermined threshold. It is an additional object of the present invention, as set forth above, to provide an operator which is micro-processor based that contains the necessary memory, hardware, and software for storing a force threshold and software routines for measuring forces for comparison to the force threshold.

It is still yet another object of the present invention, as set forth above, to allow the user to operate the door and apply a force in excess of the predetermined threshold to overcome hindrances, such as wind, parasitic drag, freezing of the door panels, and the like. One such hindrance may be a broken counterbalance spring. Accordingly, it is a further object of the present invention to allow the operator to detect a broken spring condition based upon excessive door speed while closing and allowing the operator to reduce the motor's speed and/or stop and reverse the motor.

It is still a further object of the present invention, as set forth above, to allow for the operator to detect the presence and operability of an external safety device. If the operator determines that a safety device is not provided, the operator uses its normal operating profiles and compares actual data thereto. If the safety device is present, the operator determines this directly and if the door is moving in an opening direction, the operator is instructed to use a normal profile for comparison purposes. However, if the door is traveling in a closing direction, the operator uses an enlarged or broader force threshold to allow for application of "more power" to the door until the door is closed. And it is another object of the present invention to allow application of power to the motor, even if a broken-spring condition is detected, but only when constant pressure is applied to the main operating device.

It is still yet another object of the present invention, as set forth above, to overcome hindrances or binding problems associated with movement of the door even if a safety device is not enabled, wherein the user has a way to override the force profile provided by the operator. Accordingly, if the operator detects a constant pressure applied to an operating switch, such as a wall station or a remote control, the operator determines which direction the door is traveling. Accordingly, if the door is traveling up an expanded upward force profile is employed or if the door is traveling down, an expanded downward force profile is used.

In general, the present invention contemplates a door operator for moving a door including a motor for moving the door between opened and closed positions, an operator for controlling the operation of the motor, and a switch for enabling the operator to control operation of the motor, wherein pushing and releasing the switch results in the operator allowing the motor to apply a normal range of torque values, and wherein pushing and holding the switch results in the operator allowing the motor to apply a broader-than-normal range of torque values. The invention also contemplates a door operator for moving a door includes a motor for moving the door between opened and closed positions, an operator for controlling the operation of the motor so that the motor applies a normal range of torque values, an external safety device coupled to the operator, and a switch for enabling the operator to control operation of the motor, wherein if the external safety device is enabled and the door is closing, the motor applies a broader-than-normal range of torque values. The invention further contemplates a method for overcoming hindrances encountered by an operator-controlled motor coupled to a garage door includes actuating and releasing a switch to initiate operation of the operator-controlled motor for the purpose of opening/closing the garage door, determining that the garage door is not completing the opening/closing cycle because of a hindrance, and re-actuating and holding the device to re-initiate operation of the operator-controlled motor to overcome the hindrance and complete the opening/closing cycle. And the the invention also contemplates a method for overcoming hindrances encountered by an operator-controlled motor coupled to a garage door includes actuating and releasing a switch to initiate operation of the operator-controlled motor for the purpose of opening/closing the garage door, ascertaining whether or not an external safety system is enabled and operational, applying a normal torque value to the motor if the external safety system is not operational, and applying a broader-than-normal torque value if the external safety system is operational.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
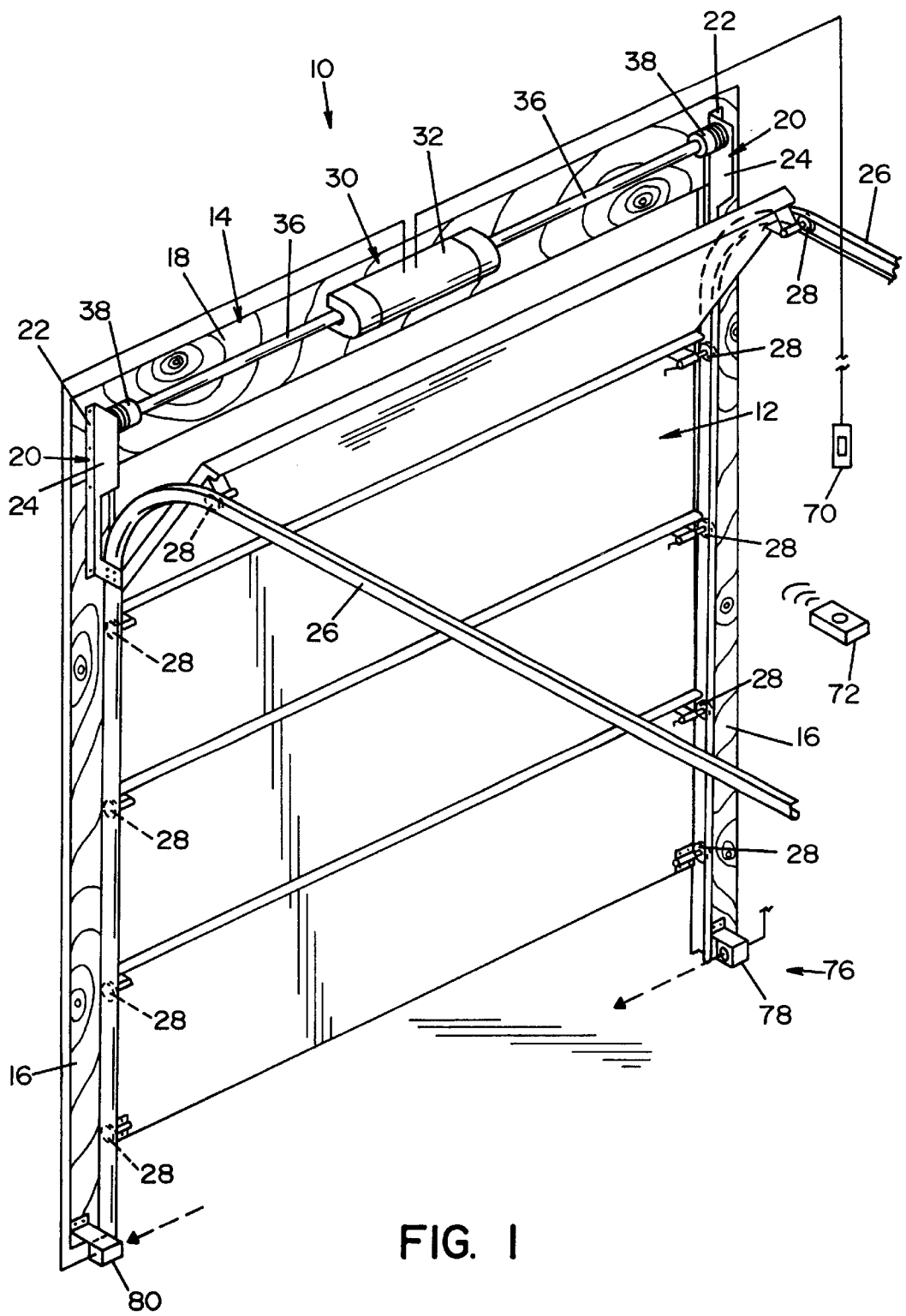
FIG. 1 is a fragmentary perspective view depicting a sectional garage door and showing an operating mechanism embodying the concepts of the present invention.

A system and related methods for increasing the allowed motor power of a motorized garage door operator is generally indicated by the numeral 10 in FIG. 1 of the drawings. The system 10 is employed in conjunction with a conventional sectional garage door generally indicated by the numeral 12. The door 12 may be an anti-pinch or pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground (not shown). The jambs 16 are spaced and joined at their vertically upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
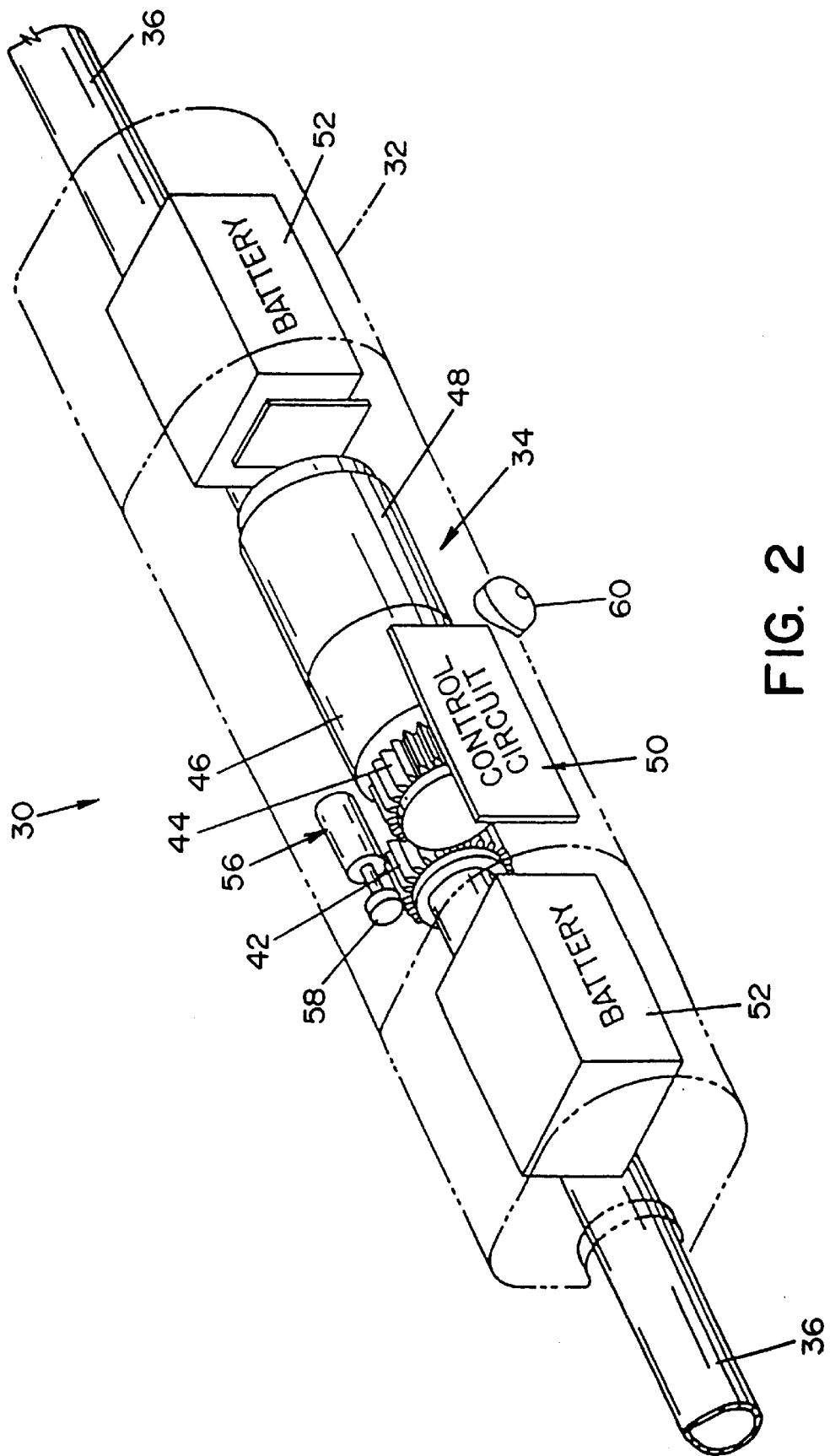
FIG. 2 is an enlarged fragmentary schematic view of the operator mechanism of FIG. 1 as viewed from the inside of the sectional garage door.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counter-balancing system 30 includes a housing 32, which is affixed to the header 18 which contains an operator mechanism generally indicated by the numeral 34 as seen in FIG. 2. Extending from each end of the operator mechanism 34 is a drive shaft 36, the opposite ends of which are received by tensioning assemblies 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with movable barriers. For example, the control routines can be easily incorporated into trolley type operators used to move garage doors.

The drive shaft 36 transmits the necessary mechanical power to transfer the garage door 12 between closing and opening positions. The drive shaft 36 provides a drive gear 42 at about a midpoint thereof wherein the drive gear 42 is coupled to a motor gear 44. Driving motion of the motor gear 44 is controlled through a gear box 46 by a motor 48 in a manner well known in the art.

A control circuit 50, which is contained within the housing 32, monitors operation of the motor 48 and various other elements contained within the operator mechanism 34 as will be described hereinbelow. Battery 52 may be connected to the drive motor 48 for the purpose of energizing the motor 48 and the control circuit 50 to provide any power required for the operation thereof.

A potentiometer generally indicated by the numeral 56 is connected to the drive gear 42 for the purpose of determining positional location of the door 12. The potentiometer 56 may also be employed to provide a speed value for the garage door as it travels between opening and closing positions. To this end, a slider 58 extends from the potentiometer 56 and is coupled to the drive gear 42 to monitor the positional rotation of the drive gear. A sensor 60, which may either be ultrasonic or infrared, is employed to monitor travel of the garage door 12.

A pulse counter (not shown) is employed to monitor rotation and speed of the motor 48 in a manner well known in the art. The pulse counter (not shown) is connected to the control circuit 50 for the purpose of supplying input thereto and allowing the control circuit 50 to take corrective action when required.

It will be appreciated that the control circuit 50 employs a processor (not shown) which receives power from the batteries 52 or from some appropriate power supply. The processor includes the necessary hardware, software, and memory to implement operation of the control circuit 50. The potentiometer is also connected to the processor where it can be seen that the potentiometer includes different points with the slider 58 disposed therebetween. In essence, the potentiometer 56 is a variable resistor, wherein the end points have an electrical potential slider across them. If the slider is moved toward the end point with the positive potential, then the slider voltage becomes more positive. If the slider is moved towards the other end point with the negative potential, then the slider voltage becomes less positive. By connecting the slider to the door 12 through the drive gear 42, the potentiometer 56 always outputs a voltage relative to the position of the door 12. If the power supply, for whatever reason, is removed from the control circuit, the slider still points to a position relative to the position of the door. If a user moves the door while the operator mechanism 34 is unpowered, the slider maintains a relative position with respect to the door and is reacquired once power is returned to the operator mechanism 34. In this manner, the processor contained within the operator can determine a force setting for each positional location of the door as it travels through its movement. From this, a force threshold envelope can be developed which accounts for parasitic drag, changes in temperatures which may possibly require a much higher (or much lower) power requirement, either of which can cause a phantom entrapment detection. Accordingly, the force threshold envelope encompasses this range of values.

Operation of the door is initiated by actuation of a control device. As seen in FIG. 1, the control device may either be a hard-wired switch 70 or a wireless remote control switch 72. It will be appreciated that the switches 70, 72 may include other functions for programming the operator, controlling lights associated with the operator and other operator-related functions. Also connected to the operator is a photo-electric eye system 76. The photo-electric eye system 76 includes a light generation device 78 connected to the control circuit 50 that generates a light beam that is detected by a receiver 80 which is also connected to the control circuit 50. If an object interrupts the light beam, the receiver relays this information to the control circuit which may initiate the appropriate corrective active. Of course, other "external" safety devices may be connected to the operator to provide similar obstruction detection input.

Figure 3:
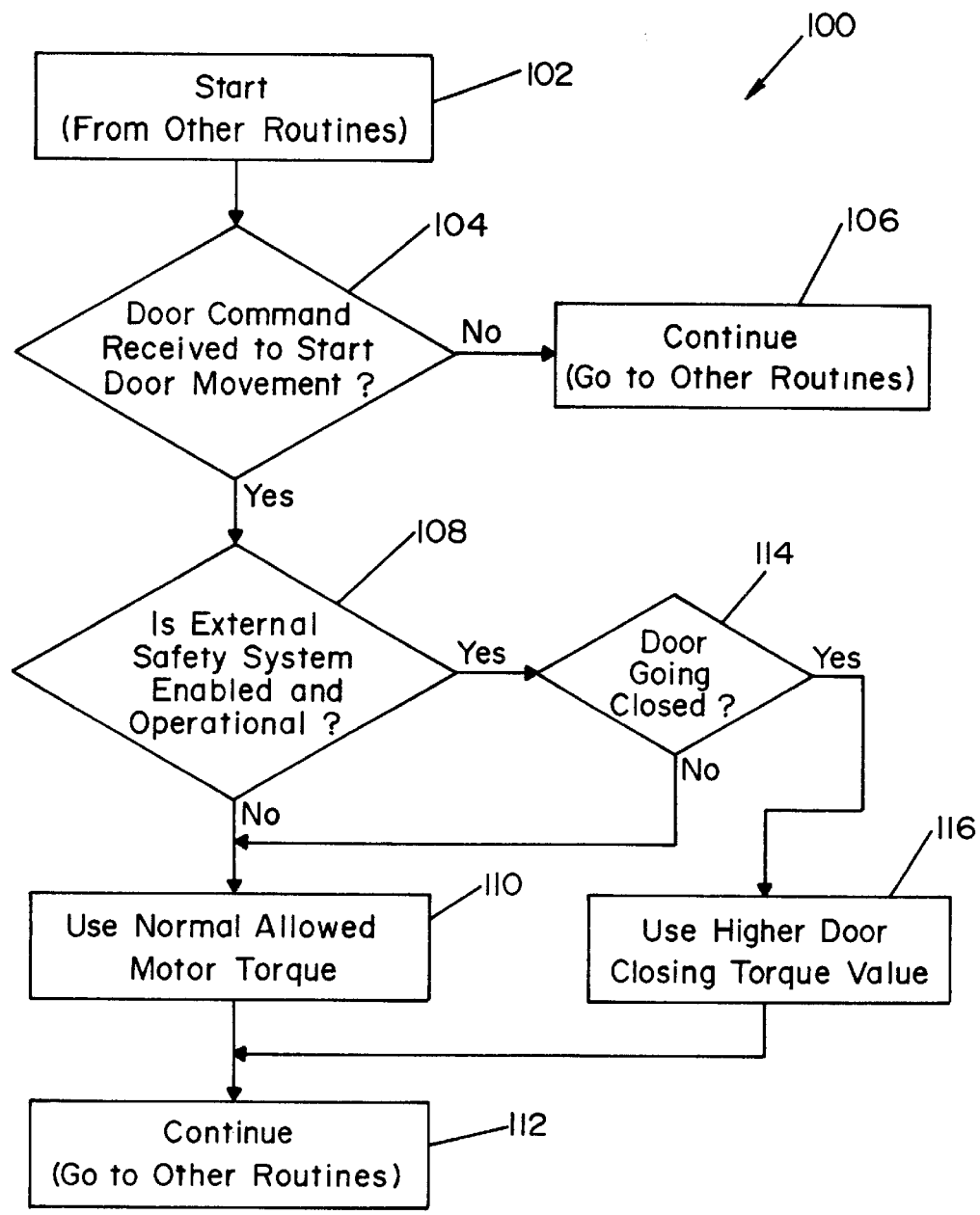
FIG. 3 is an operational flow chart employed by operator of the present invention for when an external safety system is utilized with the system.

Referring now to FIG. 3, a flow chart, designated generally by the numeral 100, is representative of software embodied and contained within the processor for controlling operation of the operator. At step 102, the operator is started and undergoes standard routines utilized in the operation of the operator. At step 104, the operator inquires as to whether a door command has been received to start door movement. A door command may be received from a hard-wired switch 70 on a wall station that is wired to the operator, a wireless wall station switch that uses an infrared, radio frequency, or other like signal, or from a remotely-controlled switch 72 all of which must be in the line of sight of the operator. The operator is able to determine from which type of device the command is generated. At step 104, if a door command is not received, the processor continues on to step 106 and the operator proceeds with other routines as required. However, if at step 104, a door command is received, the process continues to step 108.

Figure 4:
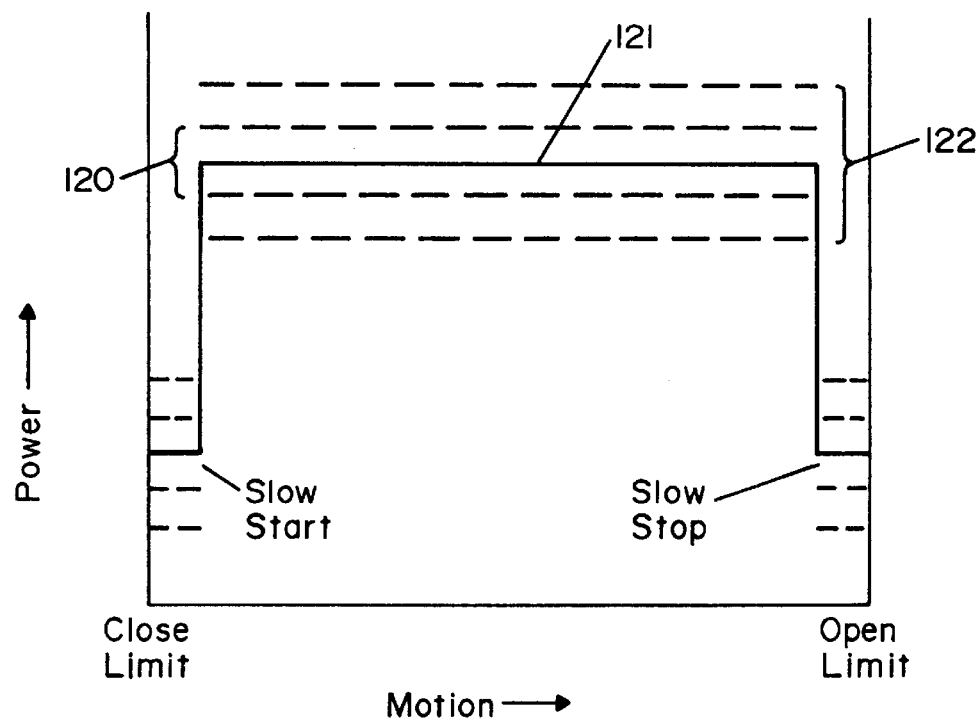
FIG. 4 is a graphical representation of the force envelopes employed by the operator of the present invention.

At step 108, if the operator determines that an external safety system is not enabled and operational, then the flow chart proceeds to step 110 where a normal allowed motor torque, which may also be referred to as power, is applied and the normal force envelope threshold is utilized. This normal force threshold envelope can be seen in FIG. 4 and is designated generally by the numeral 120. The normal force threshold envelope is centered about an actual operating profile 121. In the drawing, the profile is shown as a horizontal line, in actuality, the profile has peaks and valleys depending upon the position of the door panels as they travel through the open/close cycle. At the start of the door open/close cycle, a slow motor speed is utilized. After a predetermined period of time, a normal speed is utilized until the door is close to its open limit, whereupon the motor speed is reduced to complete the open/close cycle. Accordingly, upon completion of the cycle, the software continues at step 112 to other routines contained within the operator.

Referring back to FIG. 3, at step 108 if it is determined that the external safety system is enabled and operational, the process proceeds to step 114 to determine the door direction. If the operator determines that the door is opening, the procedural flow goes to step 110 and the process continues as described above. However, if at step 114, it is determined that the door is closing, then the operator is instructed to allow the use of a higher door closing torque value—an enlarged force threshold envelope 122 shown in FIG. 4—at step 116. It will be appreciated then the operator allows for use of an increased force envelope so that application of a higher-than-normal force by the motor, which would normally cause corrective action to be taken by the operator, is ignored. This embodiment allows for use of an external safety system which is observing the door path. Accordingly, environmental conditions such as wind or binding of the door can be overcome utilizing this embodiment without compromising the safety of the user.

Figure 5:
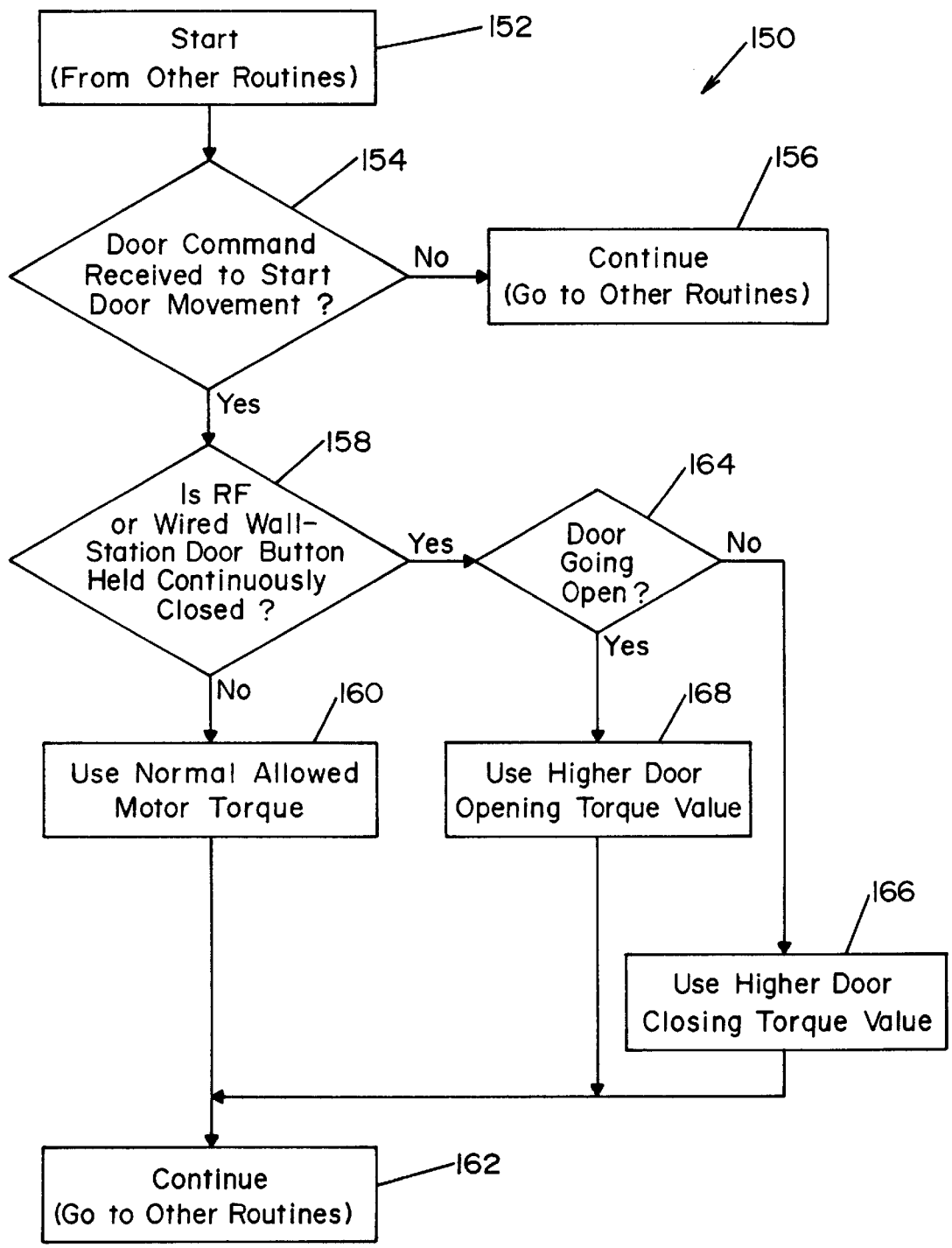
FIG. 5 is an operational flow chart employed by the operator of the present invention for when constant pressure is applied to the switch to overcome hindrances encountered by travel of the door between positions.

Referring now to FIG. 5, another operational flow chart associated with the present invention is designated generally by the numeral 150. As in the previous software routine, the chart 150 provides a starting step 152 after other routines contained by the operator have been executed. At step 154, the operator determines whether a door command has been received, from a switch 70, 72, to start door movement. If a door command has not been received, then the process proceeds to step 156 and the operator continues with its other routines. If, at step 154, it is determined that a door command has been received, the operator determines whether the in line of sight wireless switch—radio frequency, infrared or the like—or a wired wall-station door button is being held continuously closed for a predetermined period of time at step 158. If, as in normal operation, the user has momentarily pressed and released the door switch 70 or 72, then the process continues on at step 160 and a normal allowed motor torque, utilizing the normal force envelope is utilized. Then, the procedure continues at step 162 and the operator continues on with other procedural functions.

If at step 158 the wall station switch 70 or the remote switch 72 is held continuously closed for the predetermined period of time, then the procedural flow continues on to step 164 to determine the door travel direction. If at step 164 it is determined that the door is closing, then the procedure continues on to step 166 which utilizes a higher door closing torque value and the envelope 120 may exceed or go up to about 5 to 40 pounds of force from the baseline force threshold profile 121. If, however, at step 164 it is determined that the door is going in the opening direction, then at the step 168, a higher door opening torque value which exceeds the normal force envelope 120 as shown in FIG. 5, is employed. A skilled artisan will appreciate that the opening and closing profiles may be different.

It will be appreciated that the operator repeatedly monitors the position of the door switches 70, 72 at step 158 to determine if the held switch 70, 72 has been released. Once the door switch 70, 72 is released, the operator continues on to step 160 and the motor returns to its normal torque operating force and the operator continues on with its other procedural steps.

Figure 6:
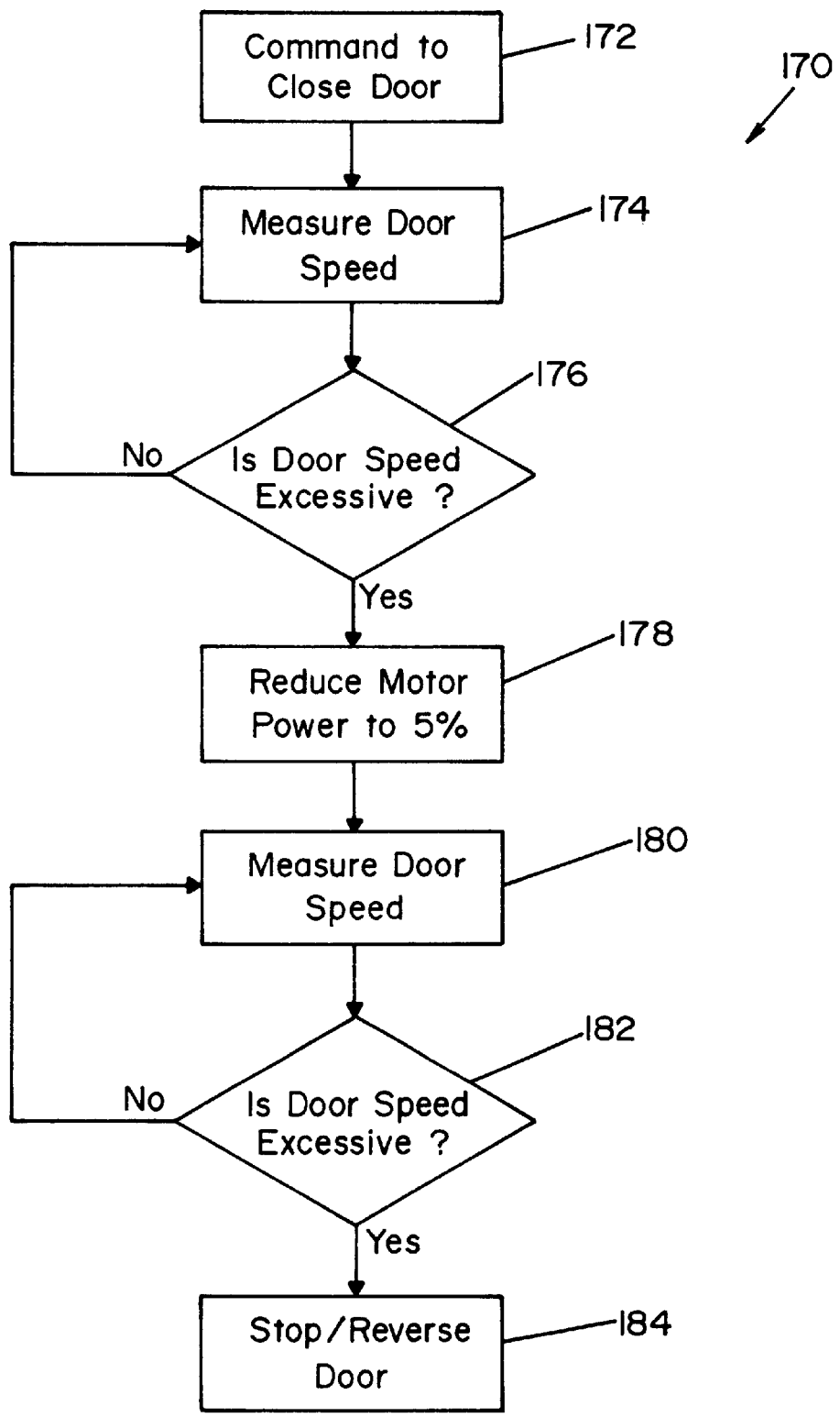
FIG. 6 is an operational flow chart employed by the operator of the present invention for detecting the presence of a broken counterbalance spring.

As noted previously, one of the conditions that is recognized as a hindrance is a broken counterbalance spring. When a spring breaks, the speed of a closing door exceeds what is normally allowed for safe operation of the door. There is a safety concern inasmuch that even if an excessive force applied by the operator system is detected, there is no provision for the operator to react quickly enough to stop and take corrective action. Accordingly, reference is made to FIG. 6 which discloses a routine for enhancing the safe operation of the operator. In FIG. 6, the flow chart is designated generally by the numeral 170. The operational flow starts at step 172, wherein a command to close the door at step 172 is received. Next, the operator measures door speed at step 174 and at step 176 determines whether the door speed is excessive. If the door speed is within the predetermined range, the flow chart returns to step 174 and step 176 is repeated. However, if at step 176, it is determined that the door speed is excessive, then the operator at step 178 reduces the motor power to about 5% of the maximum motor power. After this reduction is made, the operator at step 180 once again measures the door speed. At step 182, if it is determined that the door speed is not excessive, the flow chart and the operator return to step 180 to allow for repeating of step 182. If, at step 182, it is determined that the door speed is excessive, then corrective action is taken at step 184. This corrective action may include stopping the motor and/or reversal of the motor.

The foregoing operational check of door speed results in being unable to close the door which may be an undesirable occurrence. So, in conjunction with the routine designated by the flow chart 150, the operator is allowed to recognize that constant pressure applied on the switches 70, 72, allows for overriding of the routine 170 so that the door may be allowed to close. And, of course, constant pressure is then required to open the door as additional motor power or torque will be required to open the door in view of the broken spring.

From the foregoing, it will be appreciated that an operator system may be used which allows the user to overcome hindrances that may normally be encountered during operation of the door, but wherein these hindrances do not pose a safety problem. In other words, if it is encountered that the door is frozen to the floor, the user can apply a continuous force to the door switch 70, 72, and additional power will be supplied to the motor so as to break the ice connection and dislodge the door from its frozen position. Similar binding may occur when one of the counterbalance springs is broken so as to allow the user to open the door to allow for egress from the enclosure. It will be appreciated that if the safety system is present, the door will not operate until the additional force is applied to the motor so as to allow opening of the door. Accordingly, by use of the software routines shown in FIGS. 3, 5 and 6, a motor control, when receiving a continuous signal from a switch 70, begins a uniform increase in output current to the motor to allow the motor to move a door that would otherwise not be allowed to move. This increase in power to the motor is reset after the continuous signal from the switch 70 ceases. Accordingly, the original force threshold profile at the next input from the wall station switch or remote switch will be utilized.

Thus, it should be evident that the method and device for increasing the allowed motor power of a motorized garage door operator disclosed herein carries out the various objects of the present invention set forth above and otherwise constitutes an advantageous contribution to the art. As will be apparent to persons skilled in the art, modifications can be made to the preferred embodiments disclosed herein without departing from the spirit of the invention. Therefore, the scope of the invention herein described shall be limited solely by the scope of the attached claims.

What is claimed is:

1. A door operator for moving a door, comprising:
   a motor for moving the door between opened and closed positions;
   an operator for controlling the operation of said motor; and
   a switch for enabling said operator to control operation of said motor, wherein pushing and releasing said switch results in said operator allowing said motor to apply a normal range of torque values, and wherein pushing and holding said switch results in said operator allowing said motor to apply a broader-than-normal range of torque values.

2. The door operator according to claim 1, wherein said switch is hard-wired to said operator.

3. The door operator according to claim 1, wherein said switch is wireless and remotely actuates said operator.

4. The door operator according to claim 1, wherein releasing of said switch results in said motor returning to application of said normal range of torque values.

5. The door operator according to claim 1, further comprising an external safety device coupled to said operator, wherein said operator detects whether or not said external safety device is operational, wherein pushing and releasing said switch results in said operator allowing said motor to apply said broader-than-normal range of torque values only when the door is moving from an open to a closed position and said operator detects that said external safety device is operational.

6. The door operator according to claim 1, wherein said operator detects door speed and if the door speed is determined to be excessive, then said operator takes corrective action unless said switch is being pushed and held.

7. The door operator according to claim 6, wherein said operator first attempts to reduce motor power prior to taking corrective action for excessive door speed.

8. A door operator for moving a door, comprising:
   a motor for moving the door between opened and closed positions;
   an operator for controlling the operation of said motor so that said motor applies a normal range of torque values;
   an external safety device coupled to said operator; and
   a switch for enabling said operator to control operation of said motor, wherein if said external safety device is enabled and the door is closing, said motor applies a broader-than-normal range of torque values.

9. The operator according to claim 8, wherein if the door is opening, said operator only allows said motor to apply a normal range of torque values.

10. The operator according to claim 8, wherein if said external safety device is not enabled, pushing and releasing said switch results in said operator allowing said motor to apply a normal range of torque values, and wherein pushing and holding said switch results in said operator allowing said motor to apply a broader-than-normal range of torque values.

11. The operator according to claim 10, wherein if the door is opening, said operator allows said motor to apply a broader-than-normal range of door opening torque values.

12. The operator according to claim 10, wherein if the door is closing, said operator allows said motor to apply a broader-than-normal range of door closing torque values.

13. The door operator according to claim 8, wherein said operator detects door speed and if the door speed is determined to be excessive, then said operator takes corrective action unless said device is being pushed and held.

14. A door operator for moving a door, comprising:
   a motor for moving the door between opened and closed conditions; and
   an operator for controlling the operation of said motor and wherein said operator detects the speed of the door, and if the speed is deemed excessive, said operator reduces power to said motor without stopping said motor.

15. The door operator according to claim 14, wherein if after reducing power to said motor, said operator detects the speed of the door and determines that the speed is still excessive, said operator at least stops delivery of power to said motor.

16. The door operator according to claim 15, further comprising:
a switch for enabling said operator to control operation of said motor, wherein pushing and releasing said switch results in said operator allowing said motor to apply a normal range of torque values, and wherein pushing and holding said switch results in said operator allowing said motor to apply a broader-than-normal range of torque values.

17. The door operator according to claim 16, further comprising an external safety device coupled to said operator, wherein said operator detects whether or not said external safety device is operational, wherein pushing and releasing said switch results in said operator allowing said motor to apply said broader-than-normal range of torque values only when the door is moving from an open to a closed position and said operator detects that said external safety device is operational.

18. A method for overcoming hindrances encountered by an operator-controlled motor coupled to a garage door, comprising:
actuating and releasing a switch to initiate operation of the operator-controlled motor for the purpose of opening/closing the garage door;
determining that the garage door is not completing the opening/closing cycle because of a hindrance; and
re-actuating and holding the switch to re-initiate operation of the operator-controlled motor to overcome the hindrance and complete the opening/closing cycle.

19. The method according to claim 18, wherein said actuating and releasing step causes the operator to power the motor which in turn generates a normal operating torque value; and wherein said re-actuating and holding step causes the operator to power the motor so as to generate a higher-than-normal operating torque value.

20. The method according to claim 19, further comprising:
releasing said switch after the hindrance has been overcome to return operation of the operator controlled motor to the normal operating torque value.

21. The method according to claim 20, further comprising:
determining whether an external safety device is operational, wherein if said external safety device is operational and the door is moving in a closing direction, the operator allows the motor to apply the higher-than-normal operating torque value.

22. The method according to claim 21, wherein if said external safety device is operational and the door is moving in an opening direction, the operator only allows the motor to apply a normal operating torque value.

23. The method according to claim 18, wherein said determining step comprises:
detecting a door speed;
comparing said door speed to a predetermined door speed; and
taking corrective action to at least stop said door unless said re-actuating step is implemented.

24. A method for overcoming hindrances encountered by an operator-controlled motor coupled to a garage door, comprising:
actuating and releasing a switch to initiate operation of the operator-controlled motor for the purpose of opening/closing the garage door;
ascertaining whether or not an external safety system is enabled and operational;
applying a normal torque value to the motor if said external safety system is not operational; and
applying a broader-than-normal torque value if said external safety system is operational.

25. The method according to claim 24, further comprising:
applying said broader-than-normal torque value only if the door is moving in a closing direction.

26. The method according to claim 25, further comprising:
holding the switch closed for a predetermined period of time; and
applying said broader-than-normal torque value regardless of the door's moving direction.

27. The method according to claim 26, applying said normal torque value upon release of the device.

28. The method according to claim 25, further comprising:
detecting a door speed;
comparing said door speed to a predetermined door speed; and
taking corrective action to at least stop said door unless the switch remains closed.

29. A method for preventing door entrapment powered by a motor-controlled operator, comprising:
actuating and releasing a switch to initiate operation of the operator-controlled motor for the purpose of closing the garage door;
measuring a door speed;
comparing said door speed to a predetermined door speed; and
reducing power delivered to the operator-controlled motor to reduce said door speed if the door speed is deemed excessive.

30. The method according to claim 29, further comprising:
re-measuring said door speed; and
comparing said re-measured door speed to said predetermined door speed and at least stopping the motor if the door speed is still deemed excessive.

31. The method according to claim 30, further comprising:
reversing the motor if the door speed is deemed excessive.

32. The method according to claim 30,
actuating and releasing a switch to initiate operation of the operator-controlled motor for the purpose of opening/closing the garage door;
determining that the garage door is not completing the opening/closing cycle because of a hindrance; and
re-actuating and holding the switch to re-initiate operation of the operator-controlled motor to overcome the hindrance and complete the opening/closing cycle.

33. The method according to claim 32, wherein said actuating and releasing step causes the operator to power the motor which in turn generates a normal operating torque value; and wherein said re-actuating and holding step causes the operator to power the motor so as to generate a higher-than-normal operating torque value.

* * * * *